: (12) United States Patent
Walker

(10) Patent No.: US 7,650,481 B2
(45) Date of Patent: Jan. 19, 2010

(54) DYNAMIC CONTROL OF MEMORY ACCESS SPEED

(75) Inventor: Robert Michael Walker, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 10/997,140

(22) Filed: Nov. 24, 2004

(65) Prior Publication Data

US 2006/0112250 A1 May 25, 2006

(51) Int. Cl.
G06F 13/00 (2006.01)
G06F 13/28 (2006.01)
G11C 7/00 (2006.01)
G11C 8/00 (2006.01)
G11C 8/18 (2006.01)

(52) U.S. Cl. ................ 711/167; 365/193; 365/194; 365/233.1; 365/233.11; 365/233.12

(58) Field of Classification Search ................ 711/167; 365/193–194, 233; 713/322; 710/310
See application file for complete search history.

(56) References Cited

U.S. PATENT DOCUMENTS

| 5,778,446 | A | 7/1998 | Kim |
| 6,049,882 | A * | 4/2000 | Paver ................ 713/322 |
| 6,119,207 | A | 9/2000 | Chee |
| 6,145,052 | A * | 11/2000 | Howe et al. ................ 711/112 |
| 6,160,755 | A * | 12/2000 | Norman et al. ............ 365/233 |
| 6,542,416 | B1 * | 4/2003 | Hampel et al. ............. 365/194 |
| 6,636,909 | B1 | 10/2003 | Kahn et al. |
| 6,842,399 | B2 * | 1/2005 | Harrison .................... 365/233 |
| 6,940,768 | B2 * | 9/2005 | Dahlberg et al. .......... 365/201 |
| 2002/0013881 | A1 * | 1/2002 | Delp et al. .................. 711/105 |
| 2003/0137519 | A1 | 7/2003 | Nazanda et al. |
| 2004/0019738 | A1 | 1/2004 | Kahn et al. |
| 2004/0103258 | A1 * | 5/2004 | Blackmon et al. .......... 711/167 |

* cited by examiner

Primary Examiner—Sanjiv Shah
Assistant Examiner—Yaima Campos
(74) Attorney, Agent, or Firm—Nicholas J. Pauley; Peter M. Kamarchik; Sam Talpalatsky

(57) ABSTRACT

A memory system is disclosed in which the access speed may be adjusted. The memory system may include memory and a memory controller. The memory controller may be configured to generate a plurality of control signals to access the memory, and adjust the timing between the control signals to change the memory access speed as a function of a parameter related to the operation of the memory system.

24 Claims, 4 Drawing Sheets

DYNAMIC CONTROL OF MEMORY ACCESS SPEED

BACKGROUND

1. Field

The present disclosure relates generally to memories, and more specifically, to dynamic control of memory access speed.

2. Background

Memory systems are used extensively today in digital systems to store data needed by various processing entities. A memory system generally includes a memory controller that manages access to memory. A typical memory generally has a matrix structure formed by rows and columns of memory cells, with each memory cell being capable of storing data. A memory cell may be accessed by a processing entity, or other source, by providing the appropriate row and column address to the memory controller. The row and column address may be sent over a bus with the row address occupying the lower-order bits and the column address occupying the higher-order bits on the bus. The row and column addresses will be collectively referred to herein as the "address."

The memory controller may be used to generate the appropriate control signals for the memory from the address. More specifically, the memory controller may present a "row access strobe" to the memory to move an internal pointer to the appropriate row. This is generally thought of as opening a "page" in the memory. Once the page is opened, the memory controller may present a "column access strobe" to the memory to access a memory cell in the selected row. Thus, one can readily see that the delay associated with any memory operation depends on whether a processing entity is attempting to access an open or unopened page in the memory. If the processing entity is attempting to access an unopened page in the memory, the memory controller must present a row access strobe to the memory to move the pointer before presenting a column access strobe. If, on the other hand, the processing entity is attempting to access an open page in the memory, the memory controller needs only to present a column access strobe to the memory.

With the advent of more powerful processor based software programs, the demands on the memory have been increased. As a result, high performance memory systems with high speed access are becoming more commonplace in the market. These high performance memory systems tend to consume more power than lower performance memory systems. This is important in battery operated devices, such as cellular and wireless telephone, laptop, personal digital assistant (PDA), and the like. In these devices, as well as other applications, power saving concerns may dictate lower performance designs in terms of reduced memory access speed. These lower performance designs tend to increase battery life, but often result in one or more processing entities having to wait to access the memory.

SUMMARY

In one aspect of the present invention, a memory system includes memory, and a memory controller configured to generate a plurality of control signals to access the memory, the memory controller further being configured to adjust the timing between the control signals to change the memory access speed as a function of a parameter related to the operation of the memory system.

In another aspect of the present invention, a method of accessing memory in a memory system includes generating a plurality of control signals to access the memory, and adjusting the timing between the control signals to change the memory access speed as a function of a parameter related to the operation of the memory system.

In yet another aspect of the present invention, a memory system includes memory, and a memory controller comprising means for generating a plurality of control signals to access the memory, and means for adjusting the timing between the control signals to change the memory access speed as a function of a parameter related to the operation of the memory system.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

In one embodiment of a memory system, access speed may be dynamically adjusted based on one or more parameters, such as the current demand on the memory. In this example, the memory controller may increase access speed when the demand on the memory is high by adjusting the timing of various control signals to the memory. This may be accomplished by issuing row and column access strobes from the memory controller as quickly as the memory can handle them. More specifically, the delay between two consecutive column access strobes ($t_{CCD}$) may be set to the minimum time required to access an open page in the memory, the delay between a row access strobe and a column access strobe ($t_{RCD}$) may be set to the minimum time required to access a new page in the memory, and the delay between two consecutive row access strobes ($t_{RRD}$) may be set to the minimum time that a page must remain open until a new page can be opened. As the demand on the memory decreases, the delay between the row and column access strobes may be dynamically increased to reduce power consumption.

Figure 1:
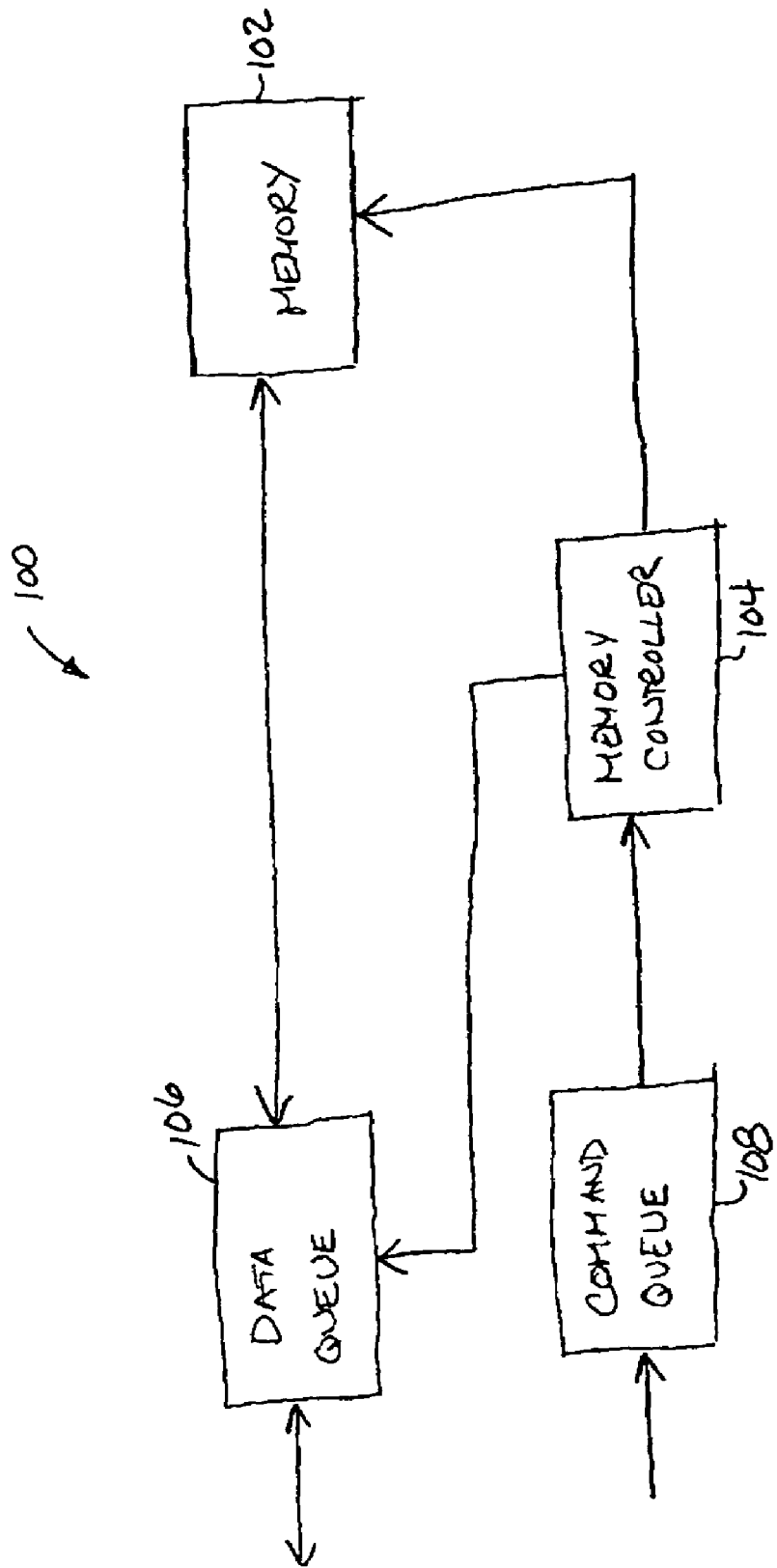
FIG. 1 is a conceptual block diagram illustrating an example of a memory system.

FIG. 1 is a conceptual block diagram illustrating an example of a memory system. The memory system 100 includes memory 102, which may be a Synchronous Dynamic Random Access Memory (SDRAM), or any other type of storage medium. A memory controller 104 may be used to manage access to the memory 102 by various processing entities (not shown). The memory system 100 may also include a data queue 106 to provide two-way buffering for data transmitted between the various processing entities and the memory 102, and a command queue 108 to buffer memory access commands associated with the data. Each command may include a read or write operation request to a particular address in the memory 102. The memory controller 104 may be used to execute the commands in the command queue 108 by providing control signals to the memory 102. The control signals may include row and column access strobes, as well as a read/write enable signal.

Figure 2:
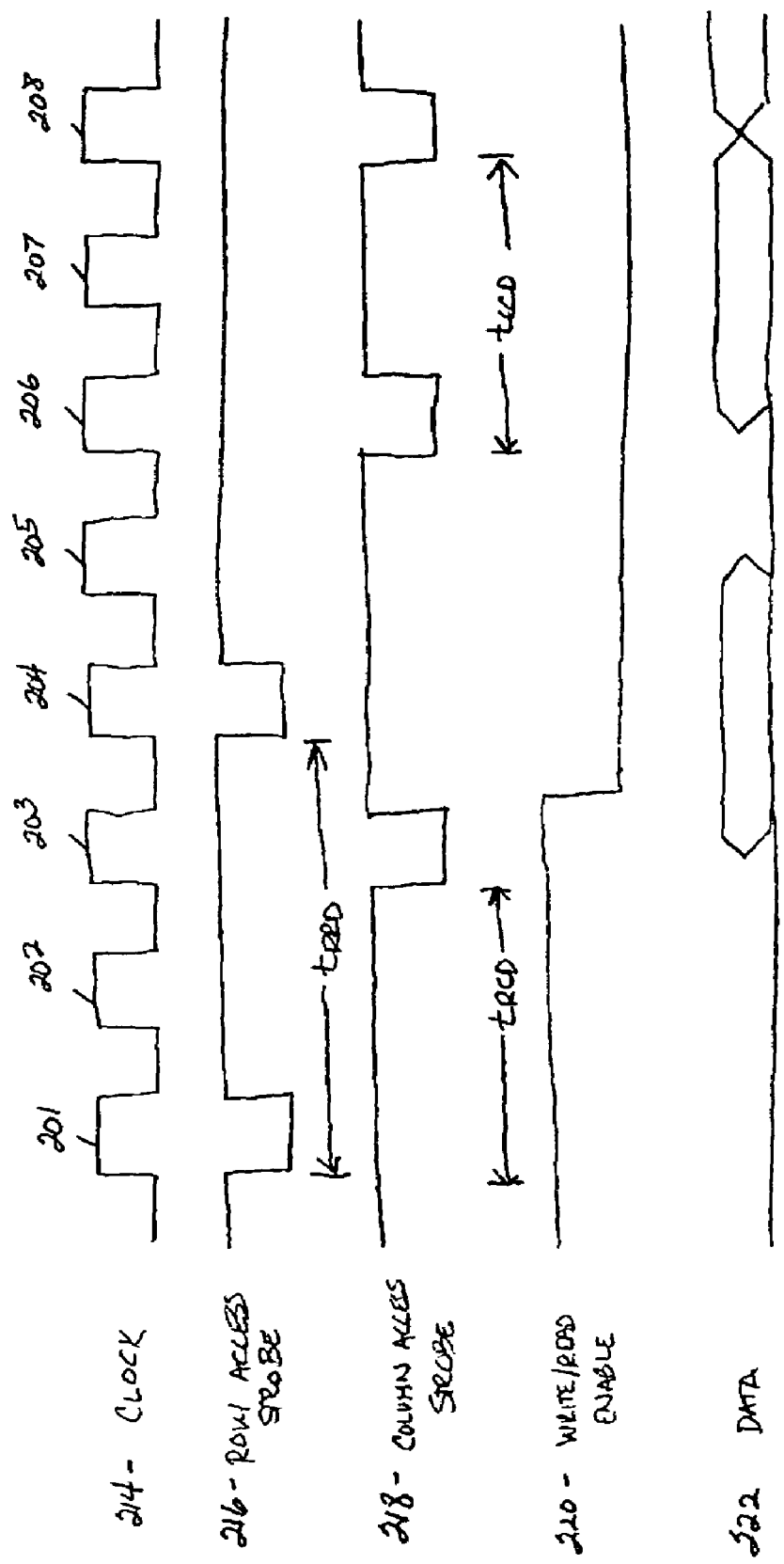
FIG. 2 is a timing diagram illustrating an example of various control signals generated by a memory controller for high speed memory access.

FIG. 2 is a timing diagram illustrating an example of various control signals generated by the memory controller. A clock 214 may be used to synchronize access to the memory. In the first clock cycle 201, the memory controller may retrieve a command from the command queue requesting a write operation to a new page in the memory. In response, the memory controller provides a row access strobe 216 to the memory. In this example, the memory requires a minimum of two clock cycles to move its internal pointer to the selected row, and therefore, $t_{RCD}$ is set to two by the memory controller.

In the third clock cycle 203, the memory controller provides a column access strobe 218 to the memory to activate the appropriate column in the selected row. During the column access strobe 218, the memory samples the read/write enable signal 220 to determine that a write operation is being requested. In response to the write operation request, the memory controller releases data from the data queue to the memory.

The memory controller may retrieve another command from the command queue requesting a read operation to a new page of the memory. In this example, however, a page in the memory must remain open for a minimum of four clock cycles to ensure proper operation, and therefore, $t_{RRD}$ is set to four by the memory controller. Consequently, the memory controller provides a row access strobe 216 to the memory in the fourth clock cycle 204. In response, the memory controller moves its internal pointer to the row corresponding to the new page in the memory.

The memory controller waits two more clock cycles, until the sixth clock cycle 206, before providing a column access strobe 218 to the memory. During the column access strobe 218, the memory samples the read/write enable signal 220 to determine that a read operation is being requested. In response to the read operation request, the memory may begin to transfer data 222 to the data queue.

The memory controller may retrieve another command from the command queue requesting a read operation to the same page in the memory. In this example, the minimum delay between two consecutive column access strobes is two, and therefore, $t_{CCD}$ is set to two by the memory controller. Consequently, the memory controller provides a column access strobe 218 to the memory in the eighth clock cycle 208. During the column access strobe 218, the memory samples the read/write enable signal 220 to determine that a read operation is being requested. In response to the read operation request, the memory may begin to transfer data 222 to the data queue.

In the example illustrated in FIG. 2, the control signals were set by the memory controller for maximum access speed to the memory. These control signals, and/or other control signals, may be adjusted by the memory controller to reduce the access speed to the memory if certain operating conditions change. By way of example, the memory controller may increase the delay between the row and column access strobes to save power when the demand for the memory is low. The manner in which the memory controller determines the demand on the memory may take on various forms. In one embodiment, the memory controller may adjust one or more control signals based on the number of commands in the command queue. The memory controller may set the memory for high speed access by decreasing the delay between the row and column access strobes when the number of commands in the command queue rises above a first threshold. The memory controller may set the memory for low speed access when the number of commands in the command queue drops below a second threshold. The first and second thresholds may be the same or different. In the latter case, hysteresis may prevent the memory controller from intermittently transitioning the memory between the high and low access speeds. By way of example, the first threshold may be set to the number of commands that results in the command queue being 30% full and the second threshold may be set to the number of commands that results in the command queue being 20% full, resulting in a 10% hysteresis band between 20% and 30%. Alternatively, the hysteresis band may be used to set one or more control signals for medium access speed to the memory. The actual threshold levels used for any particular application may depend on a variety of factors including the system performance requirements and the overall design constraints.

In some embodiments of the memory system, the memory controller may be configured to adjust the timing of one or more control signals based on considerations other than the demand on the memory. By way of example, the memory controller may adjust the timing of one or more control signals based on temperature. If the temperature is too high, the memory controller may inhibit high speed access to the memory, even during periods when the demand on the memory is high. This may be achieved by increasing the delay between the row and column access strobes as the temperature increases.

In the same and/or alternative embodiments of the memory system, the memory controller may be configured to adjust the timing of one or more control signals based on the age of the commands in the command queue. This approach may be well suited for memory systems employing multiple memory banks with a separate command queue for each bank. In this configuration, it is possible that a block of commands for one memory bank may begin to age as the memory controller executes commands for other memory banks. When this occurs, the memory controller may adjust the memory for high speed access to the memory bank with aged commands in its command queue, even if the overall demand on the memory and/or memory bank is low.

Figure 3:
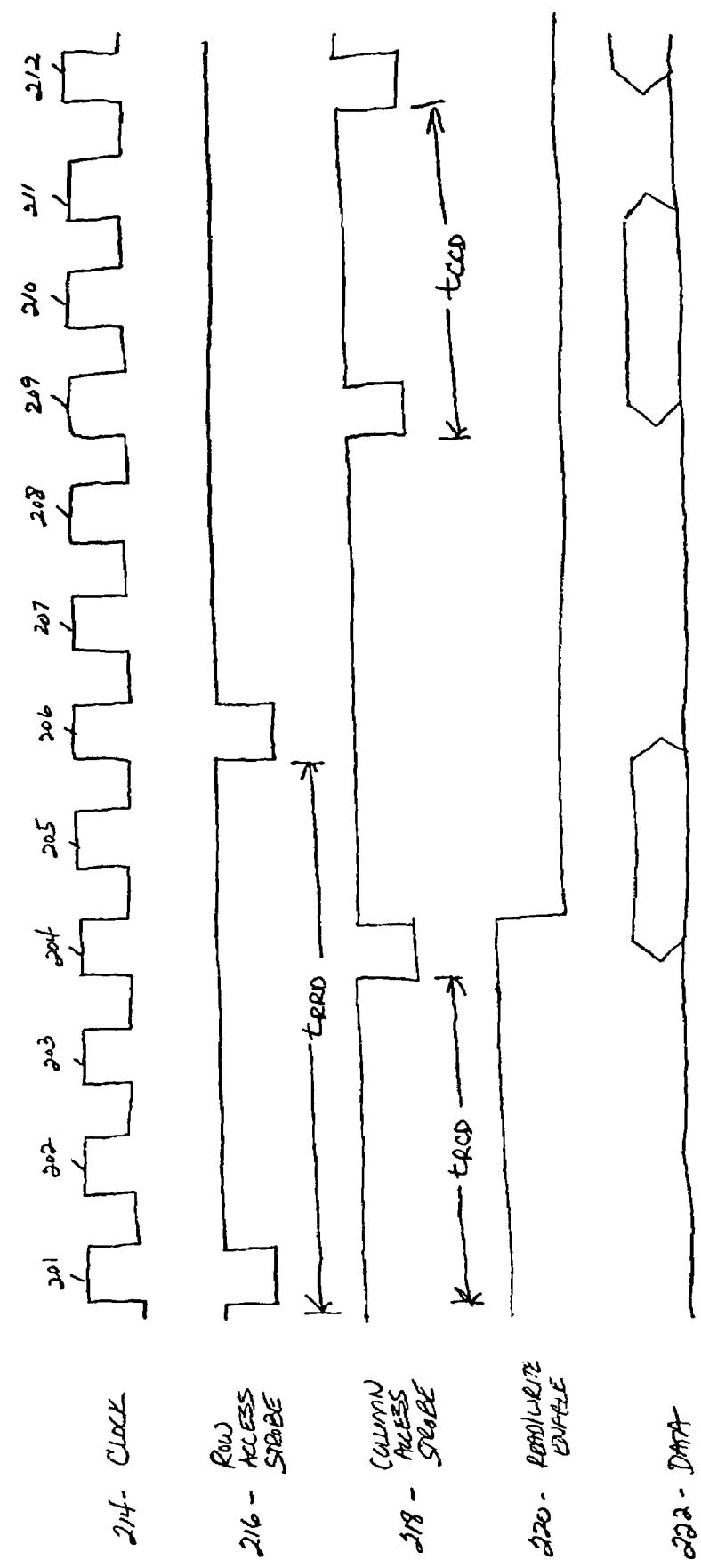
FIG. 3 is a timing diagram illustrating an example of various control signals generated by a memory controller for low speed memory access.

FIG. 3 is a timing diagram illustrating another example of various control signals generated by the memory controller for low speed access to the memory. In this example, the delay between a row and column access strobe $t_{RCD}$ has been increased from two clock cycles to three clock cycles, the delay between two consecutive row access strobes $t_{RRD}$ has been increased from four clock cycles to six clock cycles, and the delay between two consecutive column access strobes $t_{CCD}$ has been increased from two clock cycles to three clock cycles.

Referring to FIG. 3, the memory controller may retrieve a command from the command queue requesting a write operation to a new page in the memory. In response, the memory controller provides a row access strobe 216 to the memory in the first clock cycle 201, and a column access strobe 218 to the memory in the fourth clock cycle 204 to activate the appropriate column in the selected row. During the column access strobe 218, the memory samples the read/write enable signal 220 to determine that a write operation is being requested. In response to the write operation request, the memory controller releases data from the data queue to the memory.

The memory controller may retrieve another command from the command queue requesting a read operation to a new page of the memory. In this example, the memory controller provides a row access strobe 216 to the memory in the sixth clock cycle 206, and a column access strobe 218 to the memory in the ninth clock cycle 209. During the column access strobe 218, the memory samples the read/write enable signal 220 to determine that a read operation is being requested. In response to the read operation request, the memory may begin to transfer data 222 to the data queue.

The memory controller may retrieve another command from the command queue requesting a read operation to the same page of the memory. In this example, the memory controller provides a column access strobe 218 to the memory in the twelfth clock cycle 212. During the column access strobe 218 the memory samples the read/write enable signal 220 to determine that a read operation is being requested. In response to the read operation request, the memory may begin to transfer a new block of data 222 to the data queue.

Figure 4:
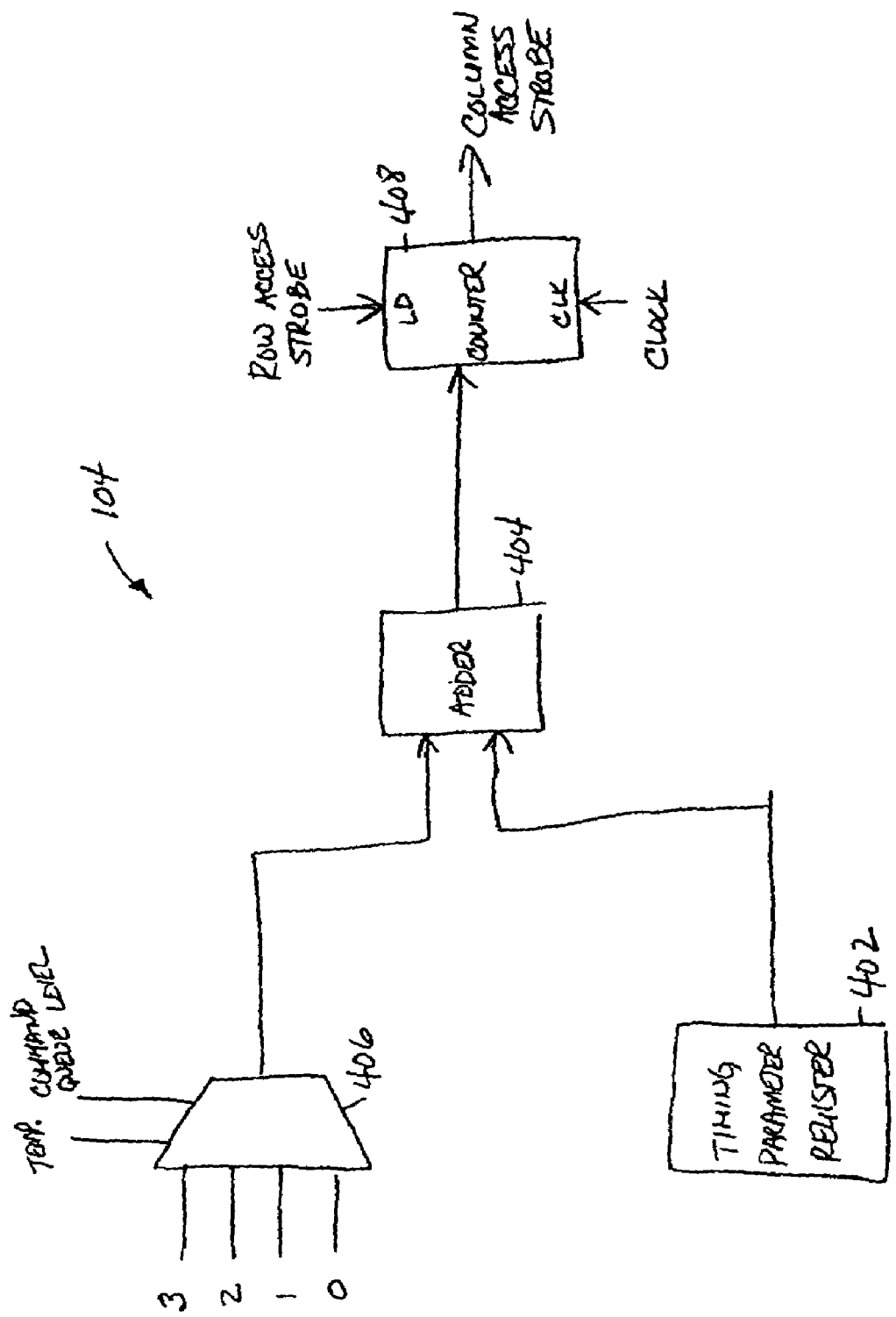
FIG. 4 is a functional block diagram illustrating one example of how a control signal for memory may be adjusted.

The timing between the control signals may be adjusted by the memory controller in a variety of fashions. FIG. 4 is a functional block diagram illustrating one example of how a control signal may be adjusted. A timing parameter register 402 may be used to store a timing parameter value for high speed access to the memory. By way of example, the timing parameter value may be the minimum time required to access an open page of memory ($t_{CCD}$), the minimum time required to access a new page in the memory ($t_{RCD}$), or the minimum time that a page must remain open until a new page can be opened ($t_{RRD}$).

An adder 404 may be used to increase the timing parameter value based on the current operating conditions. The amount that the timing parameter is increased may be determined by a multiplexer 406 which selects a delay value to add to the timing parameter value based, in this example, on both the demand on the memory and the operating temperature. The demand on the memory may be determined from a signal generated by the command queue indicating how full it is, and the operating temperature may be determined from a signal generated by one or more temperature sensors. The sum of the timing parameter value and the delay value may be loaded into a counter 408 at the appropriate time and counted down with each clock cycle. When the counter 408 reaches zero, a control signal may be provided to the memory.

An example will now be described in connection with the timing between the a row and column access strobe $t_{RCD}$. In this case, a delay value is selected by the multiplexer 406 based on the number of commands in the command queue and the operating temperature. By way of example, when the command queue is filled to a high level, a delay value of "0" may be selected if the operating temperature is low, and a delay value of "1" may be selected if the operating temperature is high. This results in the highest performance in terms of memory access speed, but also allows the access speed of the memory to be throttled back when the operating temperature increases. When the commands in the command queue drop to a low level, a delay value of "2" may be selected if the operating temperature is low, and a delay value of "3" may be selected if the operating temperature is high. In any event, the selected delay value may be added to the timing parameter value, and the resultant sum provided to the input of the counter 408. The row access strobe generated by the memory controller may be used to load the counter. The counter 408 is then counted down with each clock cycle until it reaches zero. The zero output from the counter 408 may be provided to the memory as the column access strobe.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A memory system, comprising:
   a memory;
   a memory controller configured to generate a plurality of control signals to access the memory, the memory controller further being configured to adjust the timing between the control signals to change memory access speed to a first access speed if a number of commands in a command queue of the memory system rises above a first threshold and to a second access speed if the number of commands in the command queue drops below a second threshold; and wherein the number of commands in the command queue is related to the demand on the memory, and the memory access speed is further a function of the temperature of the memory system;

the memory controller further comprising:

a multiplexer that selects a delay value based on the demand on the memory and the temperature of the memory system;

a timing parameter register that stores a timing parameter value;

an adder that sums the delay value and the timing parameter value;

a row access strobe generated by the memory controller that loads a counter with a resultant sum;

the counter counts down with each clock cycle the resultant sum until the counter reaches zero; and logic that generates a column access strobe that is provided to the memory when the counter reaches zero.

2. The memory system of claim 1 further comprising a command queue configured to receive a plurality of memory access commands from one or more sources, and to generate a signal related to the number of the commands in the command queue to be used by the memory controller to adjust the timing between the control signals.

3. The memory system of claim 1 wherein the first and second thresholds are the same.

4. The memory system of claim 1 wherein the first and second thresholds are different.

5. The memory system of claim 1 wherein the control signals comprise a row access strobe and a column access strobe.

6. The memory system of claim 5 wherein the memory controller is further configured to adjust the timing between the control signals by changing the delay between two of the row access strobes, two of the column access strobes, or one of the row access strobes and one of the column access strobes.

7. The memory system of claim 1 further comprising a command queue configured to receive a plurality of memory access commands from one or more sources, and wherein the memory access speed is further a function of the age of one or more of the commands in the command queue.

8. The memory system of claim 1 further comprising a command queue configured to receive a plurality of memory access commands from one or more sources, and wherein the control signals comprise a row access strobe and a column access strobe.

9. The memory system of claim 1 wherein the memory controller is further configured to adjust the timing between the control signals using hysteresis to reduce intermittent transitioning between the first access speed and the second access speed.

10. A method of accessing memory in a memory system, comprising:

generating a plurality of control signals to access the memory;

adjusting the timing between the control signals to change memory access speed as a function of a number of commands in a command queue of the memory system to a first access speed in response to the number of the commands in the command queue rising above a first threshold and to a second access speed in response to the number of commands in the command queue dropping below a second threshold;

wherein the number of commands in the command queue is related to the demand on the memory, and the memory access speed is further a function of the temperature of the memory system;

selecting a delay value based on the demand on the memory and the temperature of the memory system;

storing a timing parameter value in a timing parameter register;

providing a row access strobe that loads a resultant sum of the delay value and the timing parameter value into a counter;

counting down with each clock cycle the resultant sum loaded into the counter until the counter reaches zero; and providing a column access strobe to the memory when the counter reaches zero.

11. The method of claim 10 further comprising:

receiving a plurality of memory access commands into a command queue from one or more sources; and generating a signal related to the number of the commands in the command queue to be used by the memory controller to adjust the timing between the control signals.

12. The method of claim 11 wherein the first access speed is faster than the second access speed.

13. The method of claim 10 wherein the first and second thresholds are the same.

14. The method of claim 10 wherein the first and second thresholds are different.

15. The method of claim 10 wherein the control signals comprise a row access strobe and a column access strobe.

16. The method of claim 15 wherein the timing between the control signals is adjusted by changing the delay between two of the row access strobes, two of the column access strobes, or one of the row access strobes and one of the column access strobes.

17. The method of claim 10 further comprising receiving a plurality of memory access commands into a command queue from one or more sources, and wherein the memory access speed is further a function of the age of one or more of the commands in the command queue.

18. The method of claim 10 further comprising receiving a plurality of memory access commands into a command queue from one or more sources, and wherein the control signals comprise a row access strobe and a column access strobe.

19. A memory system, comprising:

a memory;

a memory controller comprising means for generating a plurality of control signals to access the memory, and means for adjusting the timing between the control signals to change memory access speed to a first access speed if a number of commands in a command queue of the memory system rises above a first threshold and to a second access speed if the number of commands in the command queue drops below a second threshold;

wherein the number of commands in the command queue is related to the demand on the memory, and the memory access speed is further a function of the temperature of the memory system;

the memory controller further comprising:

means for selecting a delay value based on the demand on the memory and the temperature of the memory system;

means for storing a timing parameter value;

means for summing the delay value and the timing parameter value;

means for loading a counter with a resultant sum;
means for counting down with each clock cycle the resultant sum until the counter reaches zero; and
means for providing a column access strobe to the memory when the counter reaches zero.

20. A memory controller comprising:
an interface that receives memory access commands and a command queue level signal that indicates the number of commands in a command queue;
a controller that generates a plurality of control signals to access a memory based on the memory access commands received by the interface, the controller further adjusts the timing between the control signals to change memory access speed to a first access speed if a command queue level is higher than a first threshold and to a second access speed if the command queue level is lower than a second threshold; and
wherein the number of commands in the command queue is related to the demand on the memory, and the memory access speed is further a function of the temperature of the memory system;
the controller further comprising:
a multiplexer that selects a delay value based on the demand on the memory and the temperature of the memory system;
a timing parameter register that stores a timing parameter value;
an adder that sums the delay value and the timing parameter value;
a row access strobe generated by the controller that loads a counter with a resultant sum;
the counter counts down with each clock cycle the resultant sum until the counter reaches zero; and
logic that generates a column access strobe that is provided to the memory when the counter reaches zero.

21. The memory controller of claim 20 wherein the control signals comprise a row access strobe and a column access strobe.

22. The memory controller of claim 21 wherein the memory controller further changes the delay between two successive row access strobes.

23. The memory controller of claim 21 wherein the memory controller further changes the delay between two successive column access strobes.

24. The memory controller of claim 21 wherein the memory controller further changes the delay between a row access strobe and a column access strobe.

* * * * *

UNITED STATES PATENT AND TRADEMARK OFFICE
CERTIFICATE OF CORRECTION

| | | |
|---|---|---|
| PATENT NO. | : 7,650,481 B2 | |
| APPLICATION NO. | : 10/997140 | |
| DATED | : January 19, 2010 | |
| INVENTOR(S) | : Walker | |

It is certified that error appears in the above-identified patent and that said Letters Patent is hereby corrected as shown below:

Column 7, line 65, claim 10: "number of the commands" to read as --number of commands--

Signed and Sealed this
Twenty-fourth Day of May, 2011

David J. Kappos
*Director of the United States Patent and Trademark Office*